(12) United States Patent
Tayal et al.

(10) Patent No.: US 11,966,984 B2
(45) Date of Patent: *Apr. 23, 2024

(54) SYSTEMS AND METHOD FOR COMBINED ACCOUNT RECONCILIATION AND VARIANCE/FLUX ANALYSIS

(71) Applicant: ServiceNow, Inc., Santa Clara, CA (US)

(72) Inventors: Ankur Tayal, San Jose, CA (US); Amir Vakili Jafari, Los Gatos, CA (US); Jessica Lee Tobin, Port Orchard, WA (US); Ellen Frances Espinosa, Morgan Hill, CA (US)

(73) Assignee: ServiceNow, Inc., Santa Clara, CA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/651,618

(22) Filed: Feb. 18, 2022

(65) Prior Publication Data

US 2022/0172300 A1    Jun. 2, 2022

Related U.S. Application Data

(62) Division of application No. 16/405,723, filed on May 7, 2019, now Pat. No. 11,257,168.

(60) Provisional application No. 62/668,038, filed on May 7, 2018.

(51) Int. Cl.
G06Q 40/12    (2023.01)
G06F 3/0482    (2013.01)
G06Q 10/0631    (2023.01)

(52) U.S. Cl.
CPC ........... *G06Q 40/12* (2013.12); *G06F 3/0482* (2013.01); *G06Q 10/063114* (2013.01); *G06Q 10/06313* (2013.01); *G06F 2203/04803* (2013.01)

(58) Field of Classification Search
CPC ........... G06Q 40/12; G06Q 10/063114; G06Q 10/06313; G06F 3/0482; G06F 2203/04803; G06F 3/0481
See application file for complete search history.

(56) References Cited

U.S. PATENT DOCUMENTS 6,609,122 B1 * 8/2003 Ensor .................. G06F 16/2365
707/800
6,678,887 B1 * 1/2004 Hallman .................. G06F 8/70
717/162

(Continued)

*Primary Examiner* — Michael Jared Walker
(74) *Attorney, Agent, or Firm* — Fletcher Yoder, PC

(57) ABSTRACT

A financial close automation (FCA) system receives or retrieves account data from one or more enterprise resource planning products (ERPs). The FCA examines the balance sheet for a given account and determines whether the account is auto-certifiable, and whether the unknown balance is below a threshold amount. If the answer to either inquiry is no, the FCA generates a task for the general ledger owner to provide an explanation for the discrepancy. A task is the created for a manager to review the provided explanation. If the manager does not approve of the provided explanation, additional information may be required. Once the manager approves the provided explanation for the discrepancy, the account is certified. If the account is auto-certifiable and the unknown balance is below the threshold amount, the account is auto-certified.

20 Claims, 8 Drawing Sheets

(56) References Cited

U.S. PATENT DOCUMENTS

| | | | | |
|---|---|---|---|---|
| 6,714,915 B1* | 3/2004 | Barnard | G06Q 10/06 | 705/7.13 |
| 7,028,301 B2* | 4/2006 | Ding | G06F 9/5011 | 718/104 |
| 7,062,683 B2* | 6/2006 | Warpenburg | G06F 11/0718 | 714/27 |
| 7,131,037 B1* | 10/2006 | LeFaive | H04L 41/0631 | 714/46 |
| 7,170,864 B2* | 1/2007 | Matharu | H04L 41/046 | 370/310 |
| 7,350,209 B2* | 3/2008 | Shum | G06F 11/3409 | 718/104 |
| 7,610,512 B2* | 10/2009 | Gerber | G06F 11/0709 | 714/26 |
| 7,617,073 B2* | 11/2009 | Trinon | G06F 11/008 | 702/183 |
| 7,689,628 B2* | 3/2010 | Garg | G06F 11/3495 | 707/793 |
| 7,783,744 B2* | 8/2010 | Garg | H04L 43/103 | 709/224 |
| 7,890,802 B2 | 2/2011 | Gerber | | |
| 7,930,396 B2* | 4/2011 | Trinon | H04L 41/5054 | 709/224 |
| 7,945,860 B2* | 5/2011 | Vambenepe | G06Q 30/06 | 715/744 |
| 7,966,398 B2* | 6/2011 | Wiles, Jr. | H04L 67/02 | 709/224 |
| 7,983,971 B1* | 7/2011 | McLuckie | G06Q 40/00 | 705/35 |
| 8,035,094 B2* | 10/2011 | Johnson | G01B 11/2425 | 250/559.42 |
| 8,051,164 B2* | 11/2011 | De Peuter | G06Q 10/10 | 709/224 |
| 8,078,508 B1* | 12/2011 | Shieh | G06Q 40/12 | 705/30 |
| 8,204,809 B1* | 6/2012 | Wise | G06Q 40/06 | 705/35 |
| 8,224,683 B2* | 7/2012 | Manos | G06Q 10/063114 | 705/7.15 |
| 8,266,096 B2* | 9/2012 | Navarrete | G06Q 10/06 | 707/600 |
| 8,457,928 B2* | 6/2013 | Dang | G06F 11/3466 | 702/186 |
| 8,478,569 B2* | 7/2013 | Scarpelli | G06F 11/3466 | 702/186 |
| 8,674,992 B2* | 3/2014 | Poston | G06T 11/20 | 345/440 |
| 8,689,241 B2* | 4/2014 | Naik | G06F 11/0781 | 719/318 |
| 8,743,121 B2* | 6/2014 | De Peuter | G06T 11/206 | 345/440 |
| 8,887,133 B2* | 11/2014 | Behnia | G06F 8/70 | 717/120 |
| 8,983,982 B2* | 3/2015 | Rangarajan | G06F 16/235 | 707/756 |
| 9,065,783 B2* | 6/2015 | Ding | H04L 47/801 | |
| 9,122,552 B2* | 9/2015 | Whitney | G06F 8/61 | |
| 9,239,857 B2* | 1/2016 | Trinon | G06F 16/248 | |
| 9,508,051 B2* | 11/2016 | Falk | G06Q 10/06375 | |
| 9,535,674 B2* | 1/2017 | Cooper | G06F 8/65 | |
| 9,535,737 B2* | 1/2017 | Joy | H04L 41/0896 | |
| 9,557,969 B2* | 1/2017 | Sharma | G06F 8/35 | |
| 9,792,387 B2* | 10/2017 | George | H04L 67/10 | |
| 2005/0015362 A1* | 1/2005 | Ostertag | G06Q 10/06311 | |
| 2005/0044197 A1* | 2/2005 | Lai | H04L 67/16 | 709/223 |
| 2005/0102212 A1* | 5/2005 | Roy | G06Q 40/06 | 705/36 R |
| 2005/0216830 A1* | 9/2005 | Turner | G06F 40/174 | 715/255 |
| 2006/0277084 A1* | 12/2006 | Barnard | G06Q 10/06312 | 705/7.13 |
| 2007/0021996 A1* | 1/2007 | Barnard | G06Q 10/063 | 705/7.26 |
| 2007/0156495 A1* | 7/2007 | King | G06Q 40/08 | 705/7.28 |
| 2009/0048883 A1* | 2/2009 | Kelly | G06Q 40/12 | 705/30 |
| 2009/0228377 A1* | 9/2009 | Stepanski | G06Q 10/06 | 705/30 |
| 2011/0029344 A1* | 2/2011 | Weiler | G06Q 30/06 | 705/7.35 |
| 2011/0191214 A1* | 8/2011 | Tam | G06Q 40/12 | 705/30 |
| 2012/0023371 A1* | 1/2012 | Laengert | G06F 11/36 | 714/32 |
| 2012/0330699 A1* | 12/2012 | Allgaier | G06Q 10/00 | 705/7.11 |
| 2014/0279304 A1* | 9/2014 | Lall | G06Q 40/12 | 705/30 |
| 2014/0358745 A1* | 12/2014 | Lunan | G06Q 40/12 | 705/30 |
| 2015/0026021 A1* | 1/2015 | Khan | G06Q 10/1091 | 705/30 |
| 2015/0379061 A1* | 12/2015 | Paraschivescu | G06F 8/71 | 707/695 |
| 2016/0127376 A1* | 5/2016 | Uitto | H04L 63/101 | 709/225 |
| 2016/0283880 A1* | 9/2016 | Jin | G06Q 10/06315 | |
| 2016/0328883 A1* | 11/2016 | Parfenov | G06T 15/20 | |
| 2016/0379158 A1* | 12/2016 | VanderMolen | G06Q 10/06395 | 705/7.41 |
| 2017/0249642 A1* | 8/2017 | Burpulis | G06Q 30/018 | |
| 2017/0270603 A1* | 9/2017 | Berta | G06Q 20/4037 | |

* cited by examiner

| | LISTS | MY LISTS | | MY PENDING LAST UPDATED 7M AGO | EDIT | | | | | | | | MAY 2018 | |
|---|---|---|---|---|---|---|---|---|---|---|---|---|---|---|
| | | | | ENTITY | GL ACCOUNT | DESCRIPTION | RISK | TEMPLATE | GROUP | STATE | ACCOUNT CURR. | GL BALANCE | VARIANCE | |
| | CLOSE TASKS MY PENDING ALL | 332 > | | 1000 USA | 101300 | JPM (CAD) WIRES OUT | ○HIGH | BANK ACC | GRP-1013XX | IN PROGRESS | USD | 6,209,118.61 | 30,000 | |
| | FOLLOW-UPS MY PENDING ALL | 334 > | | 1000 USA | 101301 | JPM (CAD) TREASURY TRANSFER | ○HIGH | BANK ACC | GRP-1013XX | IN PROGRESS | USD | 6,209,118.61 | 30,000 | |
| | | | | 1000 USA | 101303 | JPM (CAD) TREASURY TRANSFER | ○HIGH | BANK ACC | GRP-1013XX | IN PROGRESS | USD | 6,209,118.61 | 30,000 | |
| | JOURNAL ENTRIES MY PENDING ALL | 336 > | | 1000 USA | 101304 | JPM (CAD) TREASURY TRANSFER | ○HIGH | BANK ACC | GRP-1013XX | IN PROGRESS | USD | 6,209,118.61 | 30,000 | |
| | RECONCILIATION TASKS MY PENDING | 338 > | | 1000 USA | 101309 | JPM (CAD) TREASURY TRANSFER | ○HIGH | BANK ACC | | IN PROGRESS | USD | 1,052,838.38 | 1,044,838.38 | |
| | ALL | | | 1000 USA | 101310 | JPM (CAD) TREASURY TRANSFER | ○LOW | BANK ACC | | IN PROGRESS | USD | 1,052,838.38 | 1,044,838.38 | |
| | FLUX ANALYSIS MY PENDING ALL | 340 > | | 1000 USA | 101311 | JPM (CAD) TREASURY TRANSFER | ○LOW | BANK ACC | | IN PROGRESS | USD | 1,052,838.38 | 1,044,838.38 | |
| | | | | 1000 USA | 101312 | JPM (CAD) TREASURY TRANSFER | ○LOW | BANK ACC | | IN PROGRESS | USD | 6,209,118.61 | 30,000 | |
| | APPROVALS MY PENDING ALL | 342 > | | 1000 USA | 141100 | JPM (CAD) TREASURY TRANSFER | ○LOW | AMORTIZABLE | | IN PROGRESS | USD | 6,209,118.61 | 30,000 | |
| | | | | 1000 USA | 141200 | JPM (CAD) TREASURY TRANSFER | ○LOW | AMORTIZABLE | | IN PROGRESS | USD | 22,759,053.62 | 32,487.00 | |
| | | | | 1000 USA | 141300 | JPM (CAD) TREASURY TRANSFER | ○LOW | AMORTIZABLE | | IN PROGRESS | USD | 6,209,118.61 | 30,000 | |
| | | | | 1000 USA | 161300 | JPM (CAD) TREASURY TRANSFER | ○LOW | AMORTIZABLE | | IN PROGRESS | USD | 6,209,118.61 | 30,000 | |
| | | | | 1000 USA | 161301 | JPM (CAD) TREASURY TRANSFER | ○LOW | AMORTIZABLE | | IN PROGRESS | USD | 6,209,118.61 | 30,000 | |
| | | | | SHOWING 1-15 OF 17 | | | ← 1 2 → | | | | | DISPLAY 15 | RECORDS | |

SYSTEMS AND METHOD FOR COMBINED ACCOUNT RECONCILIATION AND VARIANCE/FLUX ANALYSIS

CROSS-REFERENCE TO RELATED APPLICATION

The present application is a divisional of and claims priority to U.S. patent application Ser. No. 16/405,723 entitled "SYSTEMS AND METHOD FOR COMBINED ACCOUNT RECONCILIATION AND VARIANCE/FLUX ANALYSIS" filed May 7, 2019, which claims priority to and the benefit of U.S. Provisional Application 62/668,038, entitled "INTEGRATED TOOL AND APPLICATION SUPPORT," filed May 7, 2018, the disclosure of which is incorporated herein by reference for all purposes.

BACKGROUND

The present disclosure relates generally to techniques for performing a financial close, and more specifically to techniques for account reconciliation and variance/flux analysis.

This section is intended to introduce the reader to various aspects of art that may be related to various aspects of the present disclosure, which are described and/or claimed below. This discussion is believed to be helpful in providing the reader with background information to facilitate a better understanding of the various aspects of the present disclosure. Accordingly, it should be understood that these statements are to be read in this light, and not as admissions of prior art.

Organizations, regardless of size, rely upon access to information technology (IT) and data and services for their continued operation and success. A respective organization's IT infrastructure may have associated hardware resources (e.g. computing devices, load balancers, firewalls, switches, etc.) and software resources (e.g. productivity software, database applications, custom applications, and so forth). Over time, more and more organizations have turned to cloud computing approaches to supplement or enhance their IT infrastructure solutions.

Cloud computing relates to the sharing of computing resources that are generally accessed via the Internet. In particular, a cloud computing infrastructure allows users, such as individuals and/or enterprises, to access a shared pool of computing resources, such as servers, storage devices, networks, applications, and/or other computing based services. By doing so, users are able to access computing resources on demand that are located at remote locations, which resources may be used to perform a variety computing functions (e.g., storing and/or processing large quantities of computing data). For enterprise and other organization users, cloud computing provides flexibility in accessing cloud computing resources without accruing large up-front costs, such as purchasing expensive network equipment or investing large amounts of time in establishing a private network infrastructure. Instead, by utilizing cloud computing resources, users are able redirect their resources to focus on their enterprise's core functions.

In modern communication networks, examples of cloud computing services a user may utilize include so-called infrastructure as a service (IaaS), software as a service (SaaS), and platform as a service (PaaS) technologies. IaaS is a model in which providers abstract away the complexity of hardware infrastructure and provide rapid, simplified provisioning of virtual servers and storage, giving enterprises access to computing capacity on demand. In such an approach, however, a user may be left to install and maintain platform components and applications. SaaS is a delivery model that provides software as a service rather than an end product. Instead of utilizing a local network or individual software installations, software is typically licensed on a subscription basis, hosted on a remote machine, and accessed by client customers as needed. For example, users are generally able to access a variety of enterprise and/or information technology (IT)-related software via a web browser. PaaS acts an extension of SaaS that goes beyond providing software services by offering customizability and expandability features to meet a user's needs. For example, PaaS can provide a cloud-based developmental platform for users to develop, modify, and/or customize applications and/or automating enterprise operations without maintaining network infrastructure and/or allocating computing resources normally associated with these functions.

Performing a financial close for an accounting period typically involves account reconciliation. Account reconciliation is the process of comparing records to make sure that the money being spent from an account matches the actual money that has left the account. After the financial close has been completed, a variance analysis and/or flux analysis may be performed. A variance analysis involves examining the difference between an expected or planned amount spent on a given item or group of items and the actual amount spent on the given item or group of items. A flux analysis involves examining fluctuations in money spent (in total, on a specific category of goods/services, on specific goods/services, etc.) from accounting period to accounting period. Typically, if a variance analysis and/or flux analysis is performed, the analysis takes place weeks, months, quarters, or even years after the financial close was performed. Accordingly, performing variance analysis and/or flux analysis may involve inquiries regarding transactions that are weeks old, months old, or older. As such, an individual's memory and/or documentation of the specific transaction in question may be lacking, resulting in variance analysis and/or flux analysis that is inefficient and sometimes incomplete.

SUMMARY

A summary of certain embodiments disclosed herein is set forth below. It should be understood that these aspects are presented merely to provide the reader with a brief summary of these certain embodiments and that these aspects are not intended to limit the scope of this disclosure. Indeed, this disclosure may encompass a variety of aspects that may not be set forth below.

The disclosed subject matter includes techniques for performing a combined account reconciliation and variance/flux analysis via a financial close automation (FCA) system. Specifically, the FCA system receives or retrieves account data from one or more enterprise resource planning products (ERPs). The account data may include, for example, one or more balance sheets, one or more journals, prior and current account balances, recorded activity, and so forth. The FCA system examines the balance sheet for a given account and determines whether the account is auto-certifiable, and whether the unknown balance is below a threshold amount. If the answer to either inquiry is no, the FCA system generates a task for the general ledger owner to provide activities, documentation, and/or an explanation for the discrepancy. Once the general ledger owner provides activities, documentation, and/or an explanation for the discrepancy, a task is created for a manager to review the provided activities, documentation, and/or an explanation for the discrepancy. If the manager approves the provided activities, documentation, and/or an explanation for the discrepancy, the account is certified. If the manager does not approve the provided activities, documentation, and/or an explanation for the discrepancy, a new task is created, or the previous task is re-activated, for the general ledger owner to provide additional activities, documentation, and/or an explanation for the discrepancy. Once additional activities, documentation, and/or an explanation for the discrepancy are provided, a new task is created for the manager to review the new activities, documentation, and/or an explanation for the discrepancy. This loop repeats until the manager approves and the account is certified. If the account is auto-certifiable and the unknown balance is below the threshold amount, the account is auto-certified.

Various refinements of the features noted above may exist in relation to various aspects of the present disclosure. Further features may also be incorporated in these various aspects as well. These refinements and additional features may exist individually or in any combination. For instance, various features discussed below in relation to one or more of the illustrated embodiments may be incorporated into any of the above-described aspects of the present disclosure alone or in any combination. The brief summary presented above is intended only to familiarize the reader with certain aspects and contexts of embodiments of the present disclosure without limitation to the claimed subject matter.

BRIEF DESCRIPTION OF THE DRAWINGS

Various aspects of this disclosure may be better understood upon reading the following detailed description and upon reference to the drawings in which:

FIG. 6 illustrates an embodiment of a task listing window within the FCA dashboard of FIG. 5, in accordance with aspects of the present disclosure;

FIG. 7 illustrates an embodiment of a task window within the FCA dashboard of FIG. 5, in accordance with aspects of the present disclosure.

DETAILED DESCRIPTION

Figure 1:
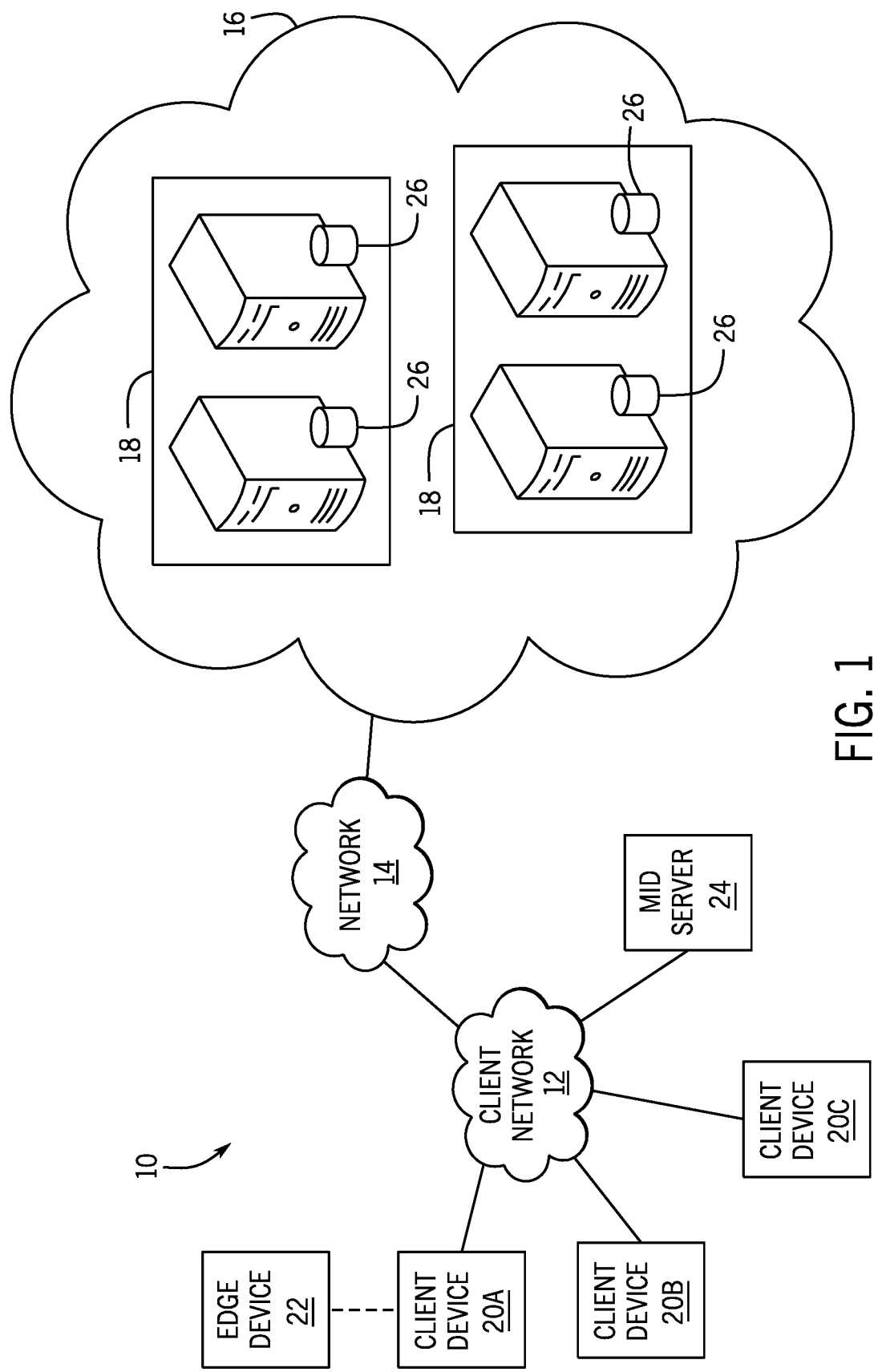
FIG. 1 is a block diagram of an embodiment of a multi-instance cloud architecture in which embodiments of the present disclosure may operate.

One or more specific embodiments will be described below. In an effort to provide a concise description of these embodiments, not all features of an actual implementation are described in the specification. It should be appreciated that in the development of any such actual implementation, as in any engineering or design project, numerous implementation-specific decisions must be made to achieve the developers' specific goals, such as compliance with system-related and enterprise-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

As used herein, the term "computing system" refers to an electronic computing device such as, but not limited to, a single computer, virtual machine, virtual container, host, server, laptop, and/or mobile device, or to a plurality of electronic computing devices working together to perform the function described as being performed on or by the computing system. As used herein, the term "medium" refers to one or more non-transitory, computer-readable physical media that together store the contents described as being stored thereon. Embodiments may include non-volatile secondary storage, read-only memory (ROM), and/or random-access memory (RAM). As used herein, the term "application" refers to one or more computing modules, programs, processes, workloads, threads and/or a set of computing instructions executed by a computing system. Example embodiments of an application include software modules, software objects, software instances and/or other types of executable code.

Performing a financial close for an accounting period typically includes account reconciliation and may involve variance analysis and/or flux analysis. Account reconciliation is the process of comparing records to make sure that the money being spent from an account matches the actual money that has left the account. The variance analysis and/or flux analysis is typically performed weeks, months, quarters, or even years after the financial close has been completed. A variance analysis involves examining the difference between an expected or planned amount spent on a given item or group of items and the actual amount spent on the given item or group of items. A flux analysis involves examining fluctuations in money spent (in general, on a specific category of goods/services, on specific goods/services, etc.) from accounting period to accounting period. Because the variance analysis and/or flux analysis is typically performed so long after the transactions in question, performing variance analysis and/or flux analysis may involve inquiries to individuals regarding transactions that are weeks old, months old, or even older. As such, the individual's memory and/or documentation of the specific transaction in question may be lacking, resulting in variance analysis and/or flux analysis that is inefficient and sometimes incomplete.

The disclosed subject matter includes techniques for performing a more streamlined financial close in which account reconciliation and variance/flux analysis are performed together, during the financial close. Specifically, a financial close automation (FCA) system receives or retrieves account data from one or more enterprise resource planning products (ERPs). The FCA system examines the balance sheet for a given account and determines whether the account is auto-certifiable, and whether the unknown balance is below a threshold amount. If the answer to either inquiry is no, the FCA system generates a task for the general ledger owner to provide an explanation for the discrepancy. A task is the created for a manager to review the provided explanation. If the manager does not approve of the provided explanation, additional information may be required. Once the manager approves the provided explanation for the discrepancy, the account is certified. If the account is auto-certifiable and the unknown balance is below the threshold amount, the account is auto-certified.

With the preceding in mind, the following figures relate to various types of generalized system architectures or configurations that may be employed to provide services to an organization in a multi-instance framework and on which the present approaches may be employed. Correspondingly, these system and platform examples may also relate to systems and platforms on which the techniques discussed herein may be implemented or otherwise utilized. Turning now to FIG. 1, a schematic diagram of an embodiment of a cloud computing system 10 where embodiments of the present disclosure may operate, is illustrated. The cloud computing system 10 may include a client network 12, a network 14 (e.g., the Internet), and a cloud-based platform 16. In some implementations, the cloud-based platform 16 may be a configuration management database (CMDB) platform. In one embodiment, the client network 12 may be a local private network, such as local area network (LAN) having a variety of network devices that include, but are not limited to, switches, servers, and routers. In another embodiment, the client network 12 represents an enterprise network that could include one or more LANs, virtual networks, data centers 18, and/or other remote networks. As shown in FIG. 1, the client network 12 is able to connect to one or more client devices 20A, 20B, and 20C so that the client devices are able to communicate with each other and/or with the network hosting the platform 16. The client devices 20 may be computing systems and/or other types of computing devices generally referred to as Internet of Things (IoT) devices that access cloud computing services, for example, via a web browser application or via an edge device 22 that may act as a gateway between the client devices 20 and the platform 16. FIG. 1 also illustrates that the client network 12 includes an administration or managerial device or server, such as a management, instrumentation, and discovery (MID) server 24 that facilitates communication of data between the network hosting the platform 16, other external applications, data sources, and services, and the client network 12. Although not specifically illustrated in FIG. 1, the client network 12 may also include a connecting network device (e.g., a gateway or router) or a combination of devices that implement a customer firewall or intrusion protection system.

For the illustrated embodiment, FIG. 1 illustrates that client network 12 is coupled to a network 14. The network 14 may include one or more computing networks, such as other LANs, wide area networks (WAN), the Internet, and/or other remote networks, to transfer data between the client devices 20 and the network hosting the platform 16. Each of the computing networks within network 14 may contain wired and/or wireless programmable devices that operate in the electrical and/or optical domain. For example, network 14 may include wireless networks, such as cellular networks (e.g., Global System for Mobile Communications (GSM) based cellular network), IEEE 802.11 networks, and/or other suitable radio-based networks. The network 14 may also employ any number of network communication protocols, such as Transmission Control Protocol (TCP) and Internet Protocol (IP). Although not explicitly shown in FIG. 1, network 14 may include a variety of network devices, such as servers, routers, network switches, and/or other network hardware devices configured to transport data over the network 14.

In FIG. 1, the network hosting the platform 16 may be a remote network (e.g., a cloud network) that is able to communicate with the client devices 20 via the client network 12 and network 14. The network hosting the platform 16 provides additional computing resources to the client devices 20 and/or the client network 12. For example, by utilizing the network hosting the platform 16, users of the client devices 20 are able to build and execute applications for various enterprise, IT, and/or other organization-related functions. In one embodiment, the network hosting the platform 16 is implemented on the one or more data centers 18, where each data center could correspond to a different geographic location. Each of the data centers 18 includes a plurality of virtual servers 26 (also referred to herein as application nodes, application servers, virtual server instances, application instances, or application server instances), where each virtual server 26 can be implemented on a physical computing system, such as a single electronic computing device (e.g., a single physical hardware server) or across multiple-computing devices (e.g., multiple physical hardware servers). Examples of virtual servers 26 include, but are not limited to a web server (e.g., a unitary Apache installation), an application server (e.g., unitary JAVA Virtual Machine), and/or a database server (e.g., a unitary relational database management system (RDBMS) catalog).

To utilize computing resources within the platform 16, network operators may choose to configure the data centers 18 using a variety of computing infrastructures. In one embodiment, one or more of the data centers 18 are configured using a multi-tenant cloud architecture, such that one of the server instances 26 handles requests from and serves multiple customers. Data centers 18 with multi-tenant cloud architecture commingle and store data from multiple customers, where multiple customer instances are assigned to one of the virtual servers 26. In a multi-tenant cloud architecture, the particular virtual server 26 distinguishes between and segregates data and other information of the various customers. For example, a multi-tenant cloud architecture could assign a particular identifier for each customer in order to identify and segregate the data from each customer. Generally, implementing a multi-tenant cloud architecture may suffer from various drawbacks, such as a failure of a particular one of the server instances 26 causing outages for all customers allocated to the particular server instance.

In another embodiment, one or more of the data centers 18 are configured using a multi-instance cloud architecture to provide every customer its own unique customer instance or instances. For example, a multi-instance cloud architecture could provide each customer instance with its own dedicated application server and dedicated database server. In other examples, the multi-instance cloud architecture could deploy a single physical or virtual server 26 and/or other combinations of physical and/or virtual servers 26, such as one or more dedicated web servers, one or more dedicated application servers, and one or more database servers, for each customer instance. In a multi-instance cloud architecture, multiple customer instances could be installed on one or more respective hardware servers, where each customer instance is allocated certain portions of the physical server resources, such as computing memory, storage, and processing power. By doing so, each customer instance has its own unique software stack that provides the benefit of data isolation, relatively less downtime for customers to access the platform 16, and customer-driven upgrade schedules. An example of implementing a customer instance within a multi-instance cloud architecture will be discussed in more detail below with reference to FIG. 2.

Figure 2:
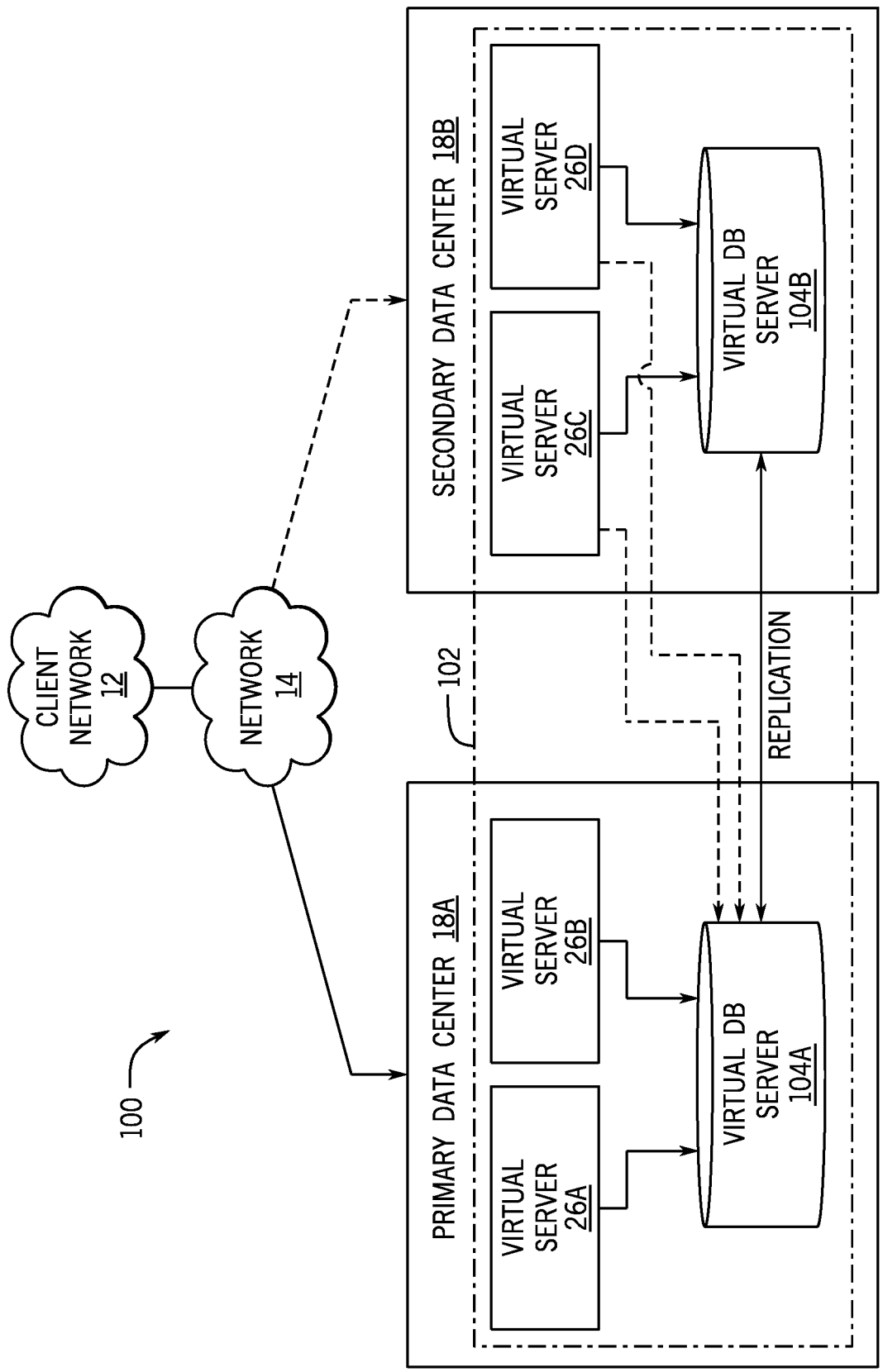
FIG. 2 is a schematic diagram of an embodiment of a multi-instance cloud architecture in which embodiments of the present disclosure may operate.

FIG. 2 is a schematic diagram of an embodiment of a multi-instance cloud architecture 100 where embodiments of the present disclosure may operate. FIG. 2 illustrates that the multi-instance cloud architecture 100 includes the client network 12 and the network 14 that connect to two (e.g., paired) data centers 18A and 18B that may be geographically separated from one another. Using FIG. 2 as an example, network environment and service provider cloud infrastructure client instance 102 (also referred to herein as a client instance 102) is associated with (e.g., supported and enabled by) dedicated virtual servers (e.g., virtual servers 26A, 26B, 26C, and 26D) and dedicated database servers (e.g., virtual database servers 104A and 104B). Stated another way, the virtual servers 26A-26D and virtual database servers 104A and 104B are not shared with other client instances and are specific to the respective client instance 102. In the depicted example, to facilitate availability of the client instance 102, the virtual servers 26A-26D and virtual database servers 104A and 104B are allocated to two different data centers 18A and 18B so that one of the data centers 18 acts as a backup data center. Other embodiments of the multi-instance cloud architecture 100 could include other types of dedicated virtual servers, such as a web server. For example, the client instance 102 could be associated with (e.g., supported and enabled by) the dedicated virtual servers 26A-26D, dedicated virtual database servers 104A and 104B, and additional dedicated virtual web servers (not shown in FIG. 2).

Although FIGS. 1 and 2 illustrate specific embodiments of a cloud computing system 10 and a multi-instance cloud architecture 100, respectively, the disclosure is not limited to the specific embodiments illustrated in FIGS. 1 and 2. For instance, although FIG. 1 illustrates that the platform 16 is implemented using data centers, other embodiments of the platform 16 are not limited to data centers and can utilize other types of remote network infrastructures. Moreover, other embodiments of the present disclosure may combine one or more different virtual servers into a single virtual server or, conversely, perform operations attributed to a single virtual server using multiple virtual servers. For instance, using FIG. 2 as an example, the virtual servers 26A, 26B, 26C, 26D and virtual database servers 104A, 104B may be combined into a single virtual server. Moreover, the present approaches may be implemented in other architectures or configurations, including, but not limited to, multi-tenant architectures, generalized client/server implementations, and/or even on a single physical processor-based device configured to perform some or all of the operations discussed herein. Similarly, though virtual servers or machines may be referenced to facilitate discussion of an implementation, physical servers may instead be employed as appropriate. The use and discussion of FIGS. 1 and 2 are only examples to facilitate ease of description and explanation and are not intended to limit the disclosure to the specific examples illustrated therein.

As may be appreciated, the respective architectures and frameworks discussed with respect to FIGS. 1 and 2 incorporate computing systems of various types (e.g., servers, workstations, client devices, laptops, tablet computers, cellular telephones, and so forth) throughout. For the sake of completeness, a brief, high level overview of components typically found in such systems is provided. As may be appreciated, the present overview is intended to merely provide a high-level, generalized view of components typical in such computing systems and should not be viewed as limiting in terms of components discussed or omitted from discussion.

Figure 3:
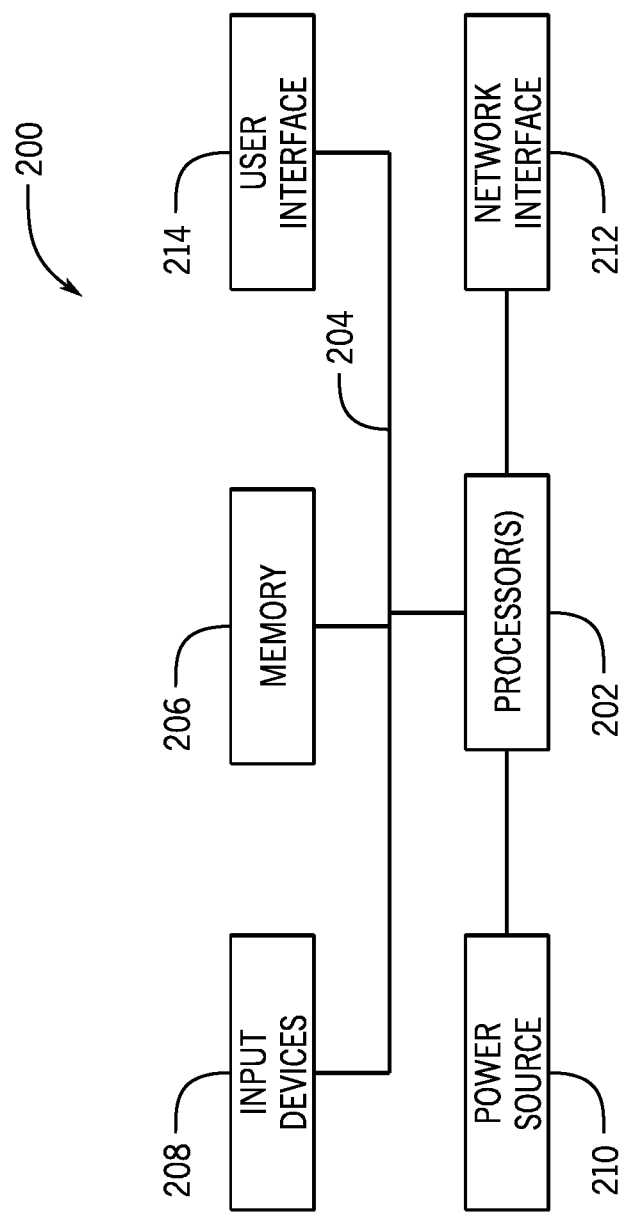
FIG. 3 is a block diagram of a computing device utilized in a computing system that may be present in FIG. 1 or 2, in accordance with aspects of the present disclosure.

By way of background, it may be appreciated that the present approach may be implemented using one or more processor-based systems such as shown in FIG. 3. Likewise, applications and/or databases utilized in the present approach may be stored, employed, and/or maintained on such processor-based systems. As may be appreciated, such systems as shown in FIG. 3 may be present in a distributed computing environment, a networked environment, or other multi-computer platform or architecture. Likewise, systems such as that shown in FIG. 3, may be used in supporting or communicating with one or more virtual environments or computational instances on which the present approach may be implemented.

With this in mind, an example computer system may include some or all of the computer components depicted in FIG. 3. FIG. 3 generally illustrates a block diagram of example components of a computing system 200 and their potential interconnections or communication paths, such as along one or more busses. As illustrated, the computing system 200 may include various hardware components such as, but not limited to, one or more processors 202, one or more busses 204, memory 206, input devices 208, a power source 210, a network interface 212, a user interface 214, and/or other computer components useful in performing the functions described herein.

The one or more processors 202 may include one or more microprocessors capable of performing instructions stored in the memory 206. Additionally or alternatively, the one or more processors 202 may include application-specific integrated circuits (ASICs), field-programmable gate arrays (FPGAs), and/or other devices designed to perform some or all of the functions discussed herein without calling instructions from the memory 206.

With respect to other components, the one or more busses 204 include suitable electrical channels to provide data and/or power between the various components of the computing system 200. The memory 206 may include any tangible, non-transitory, and computer-readable storage media. Although shown as a single block in FIG. 1, the memory 206 can be implemented using multiple physical units of the same or different types in one or more physical locations. The input devices 208 correspond to structures to input data and/or commands to the one or more processors 202. For example, the input devices 208 may include a mouse, touchpad, touchscreen, keyboard and the like. The power source 210 can be any suitable source for power of the various components of the computing device 200, such as line power and/or a battery source. The network interface 212 includes one or more transceivers capable of communicating with other devices over one or more networks (e.g., a communication channel). The network interface 212 may provide a wired network interface or a wireless network interface. A user interface 214 may include a display that is configured to display text or images transferred to it from the one or more processors 202. In addition and/or alternative to the display, the user interface 214 may include other devices for interfacing with a user, such as lights (e.g., LEDs), speakers, and the like.

Figure 4:
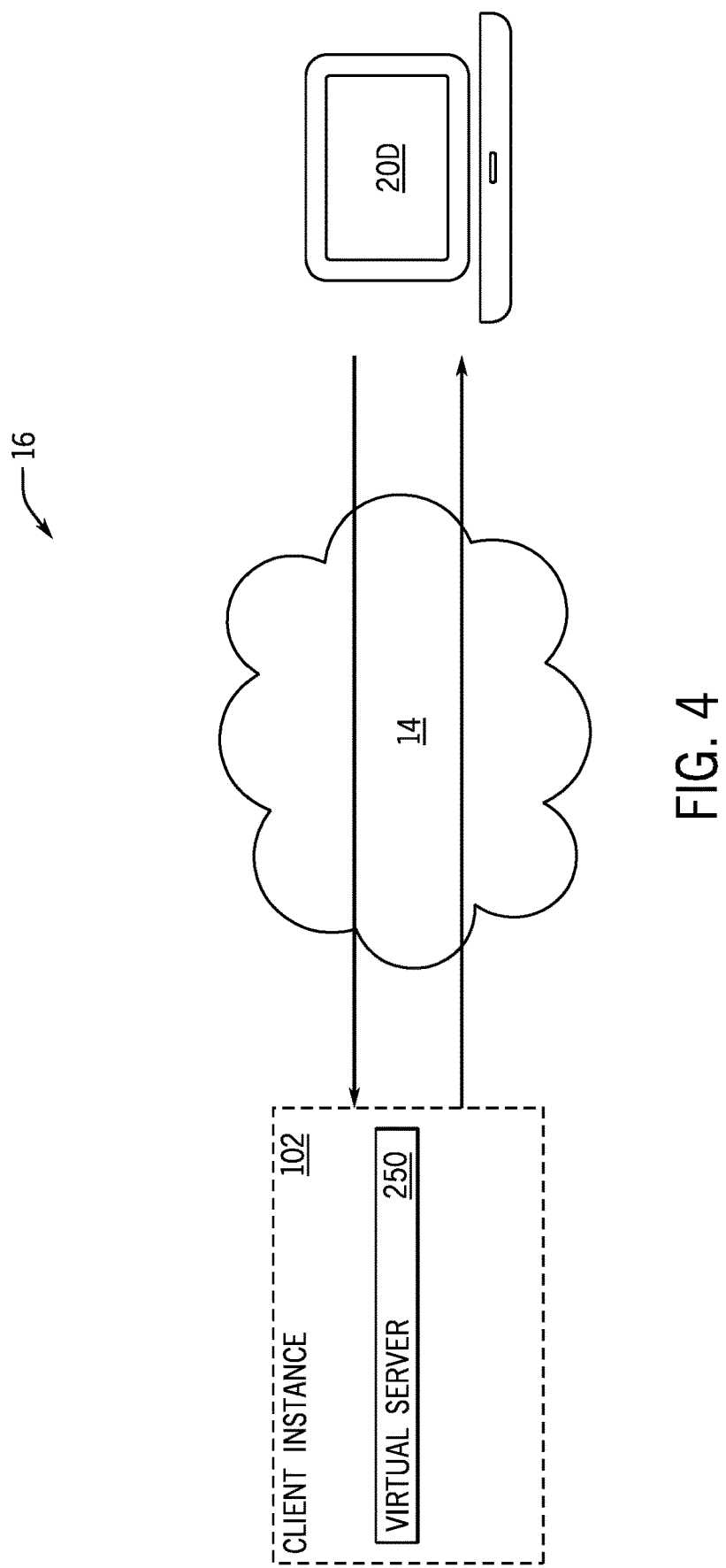
FIG. 4 is a block diagram illustrating an embodiment in which a virtual server supports and enables the client instance, in accordance with aspects of the present disclosure.

With the preceding in mind, FIG. 4 is a block diagram illustrating an embodiment in which a virtual server 250 supports and enables the client instance 102, according to one or more disclosed embodiments. More specifically, FIG. 4 illustrates an example of a portion of a service provider cloud infrastructure, including the cloud-based platform 16 discussed above. The cloud-based platform 16 is connected to a client device 20D via the network 14 to provide a user interface to network applications executing within the client instance 102 (e.g., via a web browser of the client device 20D). Client instance 102 is supported by virtual servers 26 similar to those explained with respect to FIG. 2, and is illustrated here to show support for the disclosed functionality described herein within the client instance 102. Cloud provider infrastructures are generally configured to support a plurality of end-user devices, such as client device 20D, concurrently, wherein each end-user device is in communication with the single client instance 102. Also, cloud provider infrastructures may be configured to support any number of client instances, such as client instance 102, concurrently, with each of the instances in communication with one or more end-user devices. As mentioned above, an end-user may also interface with client instance 102 using an application that is executed within a web browser.

Figure 5:
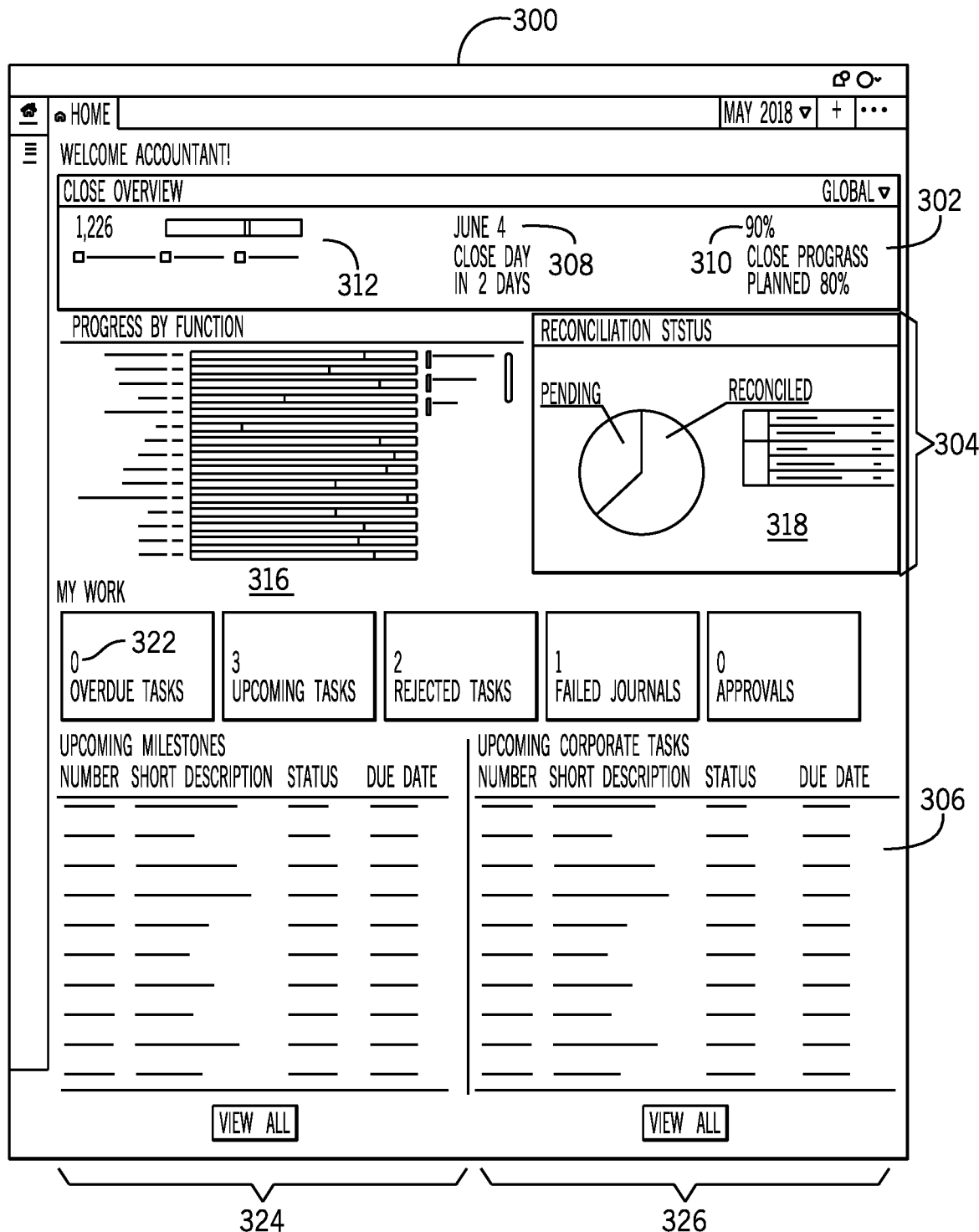
FIG. 5 illustrates an embodiment of a financial close automation (FCA) dashboard, which may be implemented via the multi-instance cloud architecture of FIGS. 1 and 2, in accordance with aspects of the present disclosure.

In some cases, an enterprise may utilize the cloud infrastructure shown in FIG. 4 to implement a financial close automation (FCA) dashboard. Accordingly, the disclosed techniques include utilizing a FCA dashboard to perform a combined account reconciliation and variance/flux analysis. FIG. 5 is a screen shot of a FCA dashboard 300. As shown, the FCA dashboard 300 includes a top region 302, a middle region 304, and a bottom region 306.

The top region 302 provides a summary. As shown, the top region 302 may include, for example, an indication of the projected close date 308, a percentage complete value 310, and a task summary 312. The projected close date 308 may display a projected or a scheduled close date and/or a number of days until the projected or scheduled close date. The percentage complete value 310 may display the percentage of completion toward close. The percentage complete may be based on time, tasks, weighted tasks, per-task time estimates, etc. In some embodiments, the percentage complete value 310 may also include a comparison of the current completion percentage to the planned completion percentage at the date in question. The task summary 312 may include an indication of the total number of tasks and an indication of the number of tasks that are completed, pending, overdue, follow-ups, etc. As shown, the task summary 312 may include a graphical representation of the breakdown of tasks into various categories (e.g., not yet started, pending, completed, overdue, etc.)

The middle region 304 includes one or more widgets, which may be customizable by the user. In the instant embodiment, the widgets may be displayed in a horizontal row. If the middle region 304 includes more widgets than can be displayed at one time, the user may scroll (e.g., using arrow buttons) to control which widgets are displayed by the middle region 304 at a given time. In the instant embodiment, the displayed widgets include a progress by function widget 316, and a reconciliation status widget 318. As shown, the progress by function widget 316 groups tasks by function and then displays the percentage complete for each group via a bar graph. In some embodiments, the bar for each group may be color coded to indicate whether the group is ahead of schedule, progressing as planned, experiencing a possible delay, and/or overdue, etc. The reconciliation status widget 318 includes a graphical representation (e.g., a pie chart) that displays the number of accounts to be closed and how many accounts fall into each status group (e.g., pending, pending approval, pending review, autoreconciled, reconciled, etc. It should be understood, however, that the widgets shown in FIG. 5 (e.g., the progress by function widget 316, and the reconciliation status widget 318) are merely examples and that the middle region may include other widgets as selected and customized by the user.

The middle region also includes a my work toolbar 322. The my work toolbar 322 displays the number of tasks assigned to a user that fall within specified categories. For example, the my work toolbar 322 may display the number of tasks assigned to the user that are overdue, the number of upcoming tasks, the number of rejected tasks, the number of failed journals, and the number of approvals. However, it should be understood, that the my work toolbar 322 may be customized to display the number of tasks assigned to the user that fall within the categories of their choosing.

The bottom region 306 includes a list of upcoming milestones 324 and a list of upcoming corporate tasks 326. The upcoming milestones list 324 displays a list of upcoming milestones, or tasks associated with milestones. Each listing includes data fields for task/milestone number, short description, status, and due date. The upcoming corporate tasks list 326 displays a list of upcoming tasks, with each listing including data fields for task number, short description, status, and due date. As shown, each list 324, 326, may not display a complete listing of the tasks/milestones that meet the given criteria. Accordingly, if the entire list is not displayed within the dashboard 300, the list may include a "view all" button that, when selected, allows the user to view all of the items on the list.

FIG. 6 illustrates a task listing window of the dashboard. As shown, the task listing window includes a task filter menu 328 and a task listing 330. The user may use the task filter menu 328 to filter the tasks displayed in the task listing 330. For example, the task filter menu may breakdown tasks by close tasks 332, follow-ups 334, journal entries 336, reconciliation tasks 338, flux analysis tasks 340, and approval tasks 342. For each task category within the task filter menu 328, the user may choose to display all of the tasks assigned to the user that fall within the selected category, or only display the tasks assigned to the user that fall within the selected category that are still pending (i.e., not completed). When a selection is made within the task filter menu 328, the task list 330 is updated to reflect the selection by displaying the tasks that fall into the selected category. As shown, for each task, the task list 330 may display data fields for an entity, GL account, description, risk level, template, group, state, account currency, GL balance, variance, etc.

Figure 7:
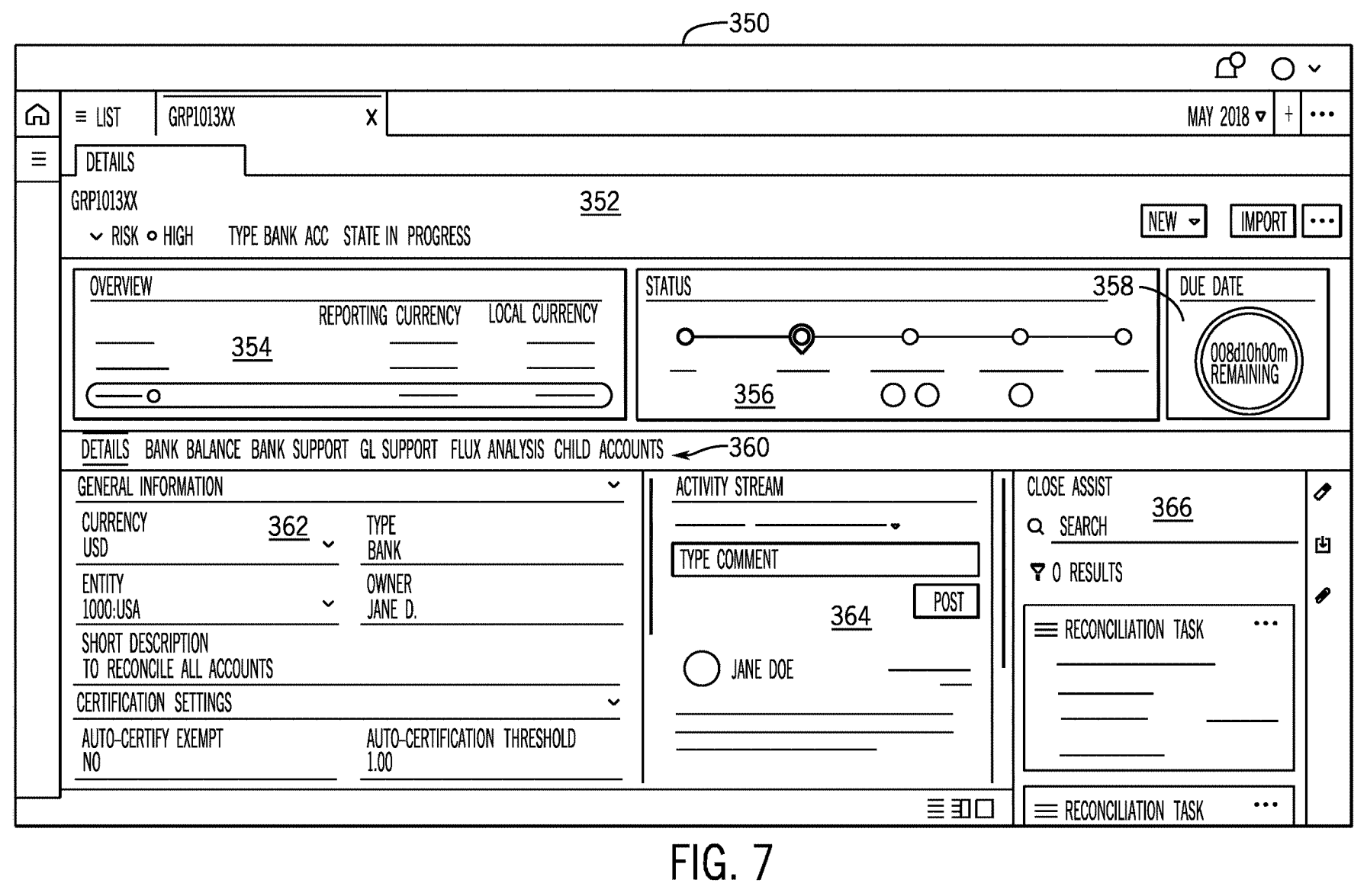

In some embodiments, the user may select the new task button or otherwise select a task to edit, causing the dashboard to open a window to create a new task or edit an existing task. FIG. 7 illustrates an embodiment of a task window 350. As shown, the task window 350 includes a task information bar 352 that displays basic information about the selected task. For example, the task information bar 352 may display the task name, a task rusk level, a task type, and a task state. In some embodiments, the task information bar 352 may also include a new task button and an import button. The new task button may be used to generate a new task. The new task may be related to the selected task (e.g., parent, child, follow-up, etc.), or otherwise unrelated to the selected task. The import button may be used to import documents or files to attach to the task or link to the task.

An overview widget 354 provides an overview of the selected task. In the instant embodiment, the overview widget provides account balances for an reconciliation and/ or flux/variance analysis task. Specifically, the overview widget 354 displays a general ledger balance, a bank balance, and a variance in both reporting and local currency. However, it should be understood that the overview widget 354 may display different information for other types of tasks. A task status widget 356 t tracks the status of a task from draft to completion. In the embodiment shown in FIG. 7, the status bar 352 includes indicators for each status, disposed in chronological order as the task moves from creation to completion. As the task moves through a status, an indicator may appear in the status indicator associated with the status. Further, the status indicator associated with the current status of the task may be emphasized in order to indicate the current status of the task. For example, in the embodiment shown in FIG. 7, the task is in process, so the "in process" status indicator is emphasized and the status indicators to the left of the "in process" status indicator have been traced. It should be understood that the status indicators in the task status widget 356 shown in FIG. 7 are merely examples and that status indicators may vary from embodiment to embodiment. For example, in some embodiments, the status indicators of the task status widget 356 may be different from different task types or for the different activities being undertaken using the FCA dashboard. Further, in some embodiments, the status indicators of the task status widget 356 may be customizable by the user.

Adjacent the task status widget 356, the task window 350 includes a due date widget 358. The due date widget 358 may identify the due date and/or the amount of time remaining until the due date. In some embodiments, the due date widget may include a graphical representation indicative of the amount of time left until the due date.

Below the task overview widget 354, the task status widget 356, and the task due date widget 358 is a row of tabs 360 and a bottom window 362. The tabs 360 control what is displayed within the bottom window 363. As shown, when a details tab is selected, the bottom window 362 displays data fields corresponding to general information about the selected task. For example, in the instant embodiment, when the details tab is selected, the bottom window displays data fields for currency, account type, entity, owner, short description, and various certification settings (e.g., whether the account is auto-certify exempt, the auto-certification threshold, if any, etc.). Other tabs within the row of tabs may include, for example, bank balance, bank support, general ledger support, flux analysis, child accounts, etc.

Adjacent the bottom window 362 are an activity stream widget 364 and a close assist widget 366. The activity stream widget 364 displays various activities associated with the task. For example, various people associated with the task (e.g., assignee, assignor, supervisor, etc.) may leave comments to each other in the activity stream widget 364, or otherwise have exchanges about the task. The activity stream widget 364 may also reflect documents or files attached or linked to the task, changes to the status of the task, actions performed toward completion of the task, etc. The close assist widget 366 may display information in order to help a user with tasks related to financial close. For example, in the instant embodiment, the close assist widget 366 displays related reconciliation tasks.

The FCA dashboard described in FIGS. 5-7 may be used to perform account reconciliation and variance/flux analysis, two processes that are typically performed separately. Account reconciliation, which occurs after an account is closed for a given time period to confirm activity on the account is current (e.g., balance sheet accounts should have a zero balance indicating no pending activity). Variance/flux analysis identifies trends, increases, or decreases in an account balance or account activity over time. In one implementation, the account reconciliation process is automated and combined with the variance/flux analysis (i.e., comparing current balances to balances from prior periods) to improve efficiency and convenience for personnel tasked with these functions.

In one implementation, combining account reconciliation and variance/flux analysis allows users of the FCA system to be able to view their own accounts and to add notes, activities, and supporting documents for unidentified balances as part of performing reconciliation activities. Concurrently or contemporaneously, users will be able to view the account balances over a period of time such as quarter-over-quarter (QoQ), year-over-year (YoY), year-to-date (YTD), and so forth, and will be able to perform variance/flux analysis (i.e., comparison to prior time periods, such as to identify trends, spikes, and so forth in the account activity) and capture the details, which can be viewed in the dashboard and/or via a report, such as by leadership, auditors, and so forth. This capability to be able to do variance/flux analysis and add commentary at the time of performing account reconciliation increases productivity and results in time savings.

In some embodiments, templates for different types of accounts (fixed assets, accruals, bank, etc.) may be created, allowing users to view and record information specific to those accounts. Users can also set the threshold which will automatically certify accounts that have unknown balances within the threshold, (e.g., a tolerance). Zero balance accounts can also be automatically certified. In one implementation, the process is integrated with FCA dashboard task management functionality and journal automation applications, which enable users to see if any journals specific to their accounts are pending to be posted. If so, they will wait for starting the reconciliation until journals are posted in the respective enterprise resource planning (ERP) package.

Figure 8:
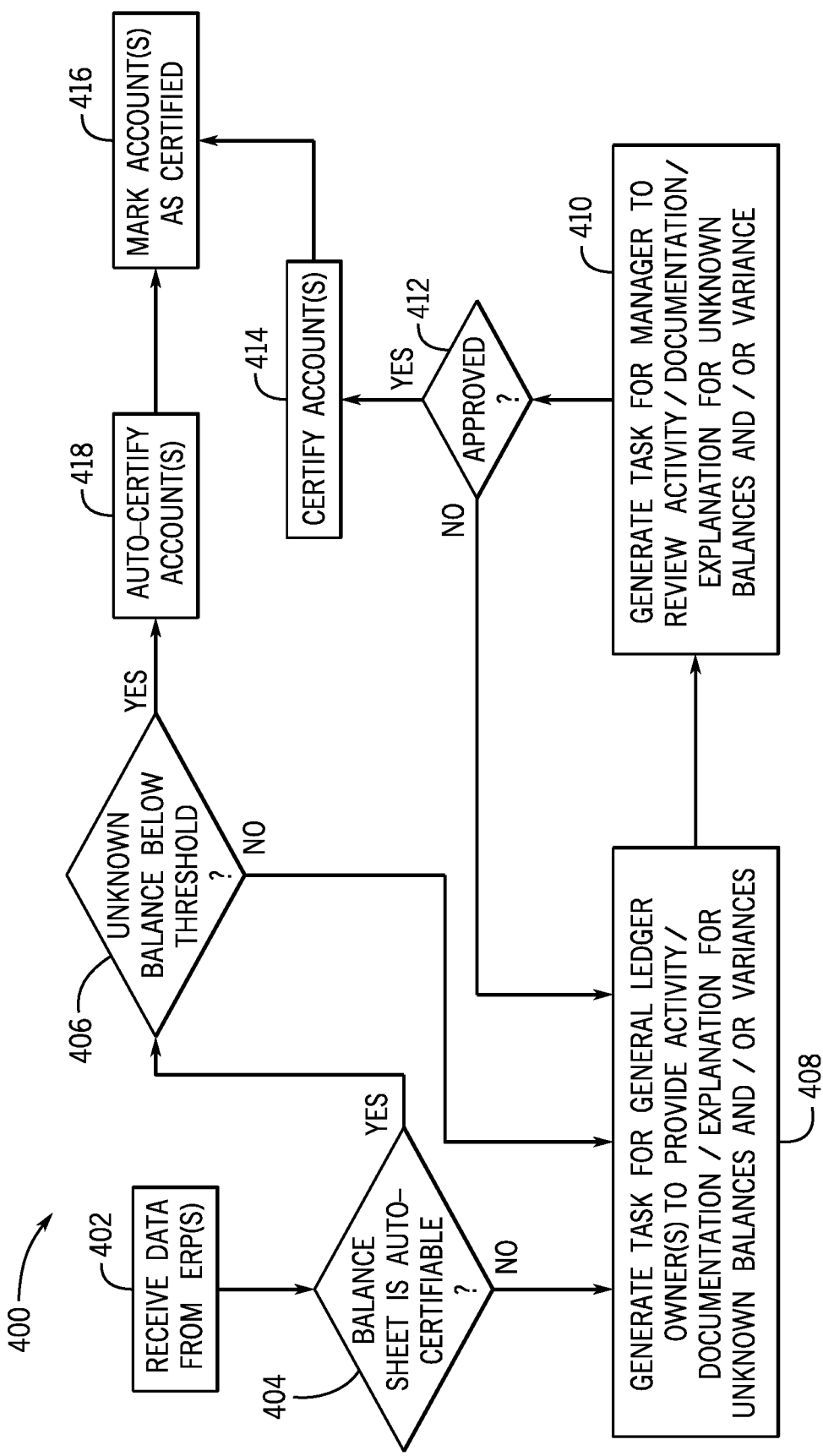
FIG. 8 is a flowchart of a process for combined account reconciliation and variance/flux analysis, in accordance with aspects of the present disclosure.

With this in mind, FIG. 8 is a flowchart of a process 400 that combines account reconciliation and variance/flux analysis. At block 402, the FCA system receives account data from one or more ERPs. For example, different ERPs may be preferred for different functionality or reporting, by different organizations of the enterprise, for use in different geographic reporting regions because of different features they provide in those regions, and so forth. The enterprise may also utilize different ERPs for different aspects of its operations. For example, the enterprise may utilize a first ERP for procurement, a second ERP for production, a third ERP for distribution, a fourth ERP for accounting, a fifth ERP for human resources, a sixth ERP for customer service, a seventh ERP for sales, and so forth. The FCA dashboard may be configured to integrate with one or more of the various ERPs in order to facilitate account reconciliation and variance/flux analysis.

In this embodiment, the FCA system may function as a normalizing top-layer that creates and/or maintains an underlying set of data commonly used by one or more of the ERPs. In this manner, the FCA dashboard may function as a single gateway by which a user interacts with or updates one or more ERPs without having to individually manipulate or interact with each ERP. Thus, the user may, via the FCA dashboard, request reports from one or more ERPs used by the user's organization, with the FCA system parsing the data and/or formatting communications for each respective ERP such that the user need only be familiar with the FCA dashboard commands and interface. Alternatively, work performed on the FCA dashboard, such as performing a reconciliation and variance/flux analysis on an account, may be performed without logging into or working in the ERP package itself. For example, if a user has multiple different ERP or multi-ERP instances in their landscape, the user can perform their work in the FCA dashboard and all the journal entries made using the FCA dashboard may be automatically posted in the ERP packages used by the client.

The received or retrieved account data may include, for example, one or more balance sheets, one or more journals, prior and current account balances, recorded activity, and so forth. The account data may be accessed by a cloud-platform provided with which the financial personnel interact, such as over a multi-instance architecture.

At decision 404, the balance sheet or sheets are analyzed to determine whether the balance sheet or sheets are auto-certifiable. A determination may be made as to whether a balance sheet (BS) account is auto-certifiable based on the pulled account information. An account is determined to be auto-certifiable if it meets certain criteria set by the user or owner. For example, certain types of accounts may be designated as auto-certifiable, while other types of accounts, or specific accounts, may be exempt from auto-certification. Further, an account may be auto-certifiable if the total balance, the general ledger balance, the unknown balance, the total amount of activity, the flux, and/or the variance is below a set threshold value, or some other condition is met. If the balance sheet is auto-certifiable, the process 400 proceeds to block 406 and determines whether the unknown balance of the balance sheet is above or below a threshold value. If the balance sheet is not auto-certifiable, the process 400 proceeds to block 408 and generates a task for the general ledger owner or owners to provide an explanation and/or documentation for unknown balances and/or variances. For example, a task may be displayed within the task list window of the general ledger owner's dashboard. Upon selection of the task, the task window may be updated to prompt the general ledger owner to provide activities, explanation, and/or documentation for any flagged unknown balances and/or variances. As previously described, the FCA dashboard may allow a user to attach or link one or more documents to a task.

At block 410, a task is generated for a manager to review the activities, explanation, and/or documentation provided by the general ledger owner. For example, a task may be displayed within the task list window of the manager's dashboard. Upon selection of the task, the task details window may be updated to prompt the manager to review the activities, explanation, and/or documentation for any flagged unknown balances and/or variances provided by the general ledger owner. The manager may decide whether or not to approve the activities, explanation, and/or documentation as justifying the flagged unknown balances.

At decision 412, if the manager does not approve the activities, explanation, and/or documentation as justifying the flagged unknown balances, the process returns to block 408 and requests additional activities, explanation, and/or documentation from the general ledger owner to justify the flagged unknown balances. In some embodiments, a new task for the general ledger owner may be created. In other embodiments, the previous task requesting activities, explanation, and/or documentation may be reactivated such that the task appears on the general ledger owner's task list. If new activities, explanation, and/or documentation from the general ledger owner to justify the flagged unknown balances are provided by the ledger owner, the process returns to block 410 and generates a task for the manager to review the activities, explanation, and/or documentation provided by the general ledger owner. The loop of blocks 408, 410, and 412 may repeat as needed until the activities, explanation, and/or documentation provided by the general ledger owner are approved by the manager. Once the manager approves of the activities, explanation, and/or documentation provided by the general ledger owner, the process 400 proceeds to block 414 and certifies the accounts. The certification may be an explicit certification (e.g., an additional input by the manager, an additional task, etc.), or the certification may be implied based upon the approval of the activities, explanation, and/or documentation. Once the accounts have been certified, the process marks the accounts in the FCA system as certified (block 416).

Returning to block 406, if an unknown balance for an account is above a threshold value, the process proceeds to block 408 and generates a task for the general ledger owner or owners to provide activities, an explanation, and/or documentation for unknown balances. The process then enters the loop of blocks 408, 410, and 412 previously described until the manager approves of the provided activities, an explanation, and/or documentation for unknown balances. If the unknown balance for an account is below the threshold value, the process proceeds to block 418 and auto-certifies the account or accounts. Once the accounts have been certified, the process marks the accounts in the FCA system as certified (block 416).

The disclosed subject matter includes techniques for performing a combined account reconciliation and variance/flux analysis via a financial close automation (FCA) system. Specifically, the FCA system receives or retrieves account data from one or more enterprise resource planning products (ERPs). The account data may include, for example, one or more balance sheets, one or more journals, prior and current account balances, recorded activity, and so forth. The FCA system examines the balance sheet for a given account and determines whether the account is auto-certifiable, and whether the unknown balance is below a threshold amount. If the answer to either inquiry is no, the FCA system generates a task for the general ledger owner to provide activities, documentation, and/or an explanation for the discrepancy. Once the general ledger owner provides activities, documentation, and/or an explanation for the discrepancy, a task is created for a manager to review the provided activities, documentation, and/or an explanation for the discrepancy. If the manager approves the provided activities, documentation, and/or an explanation for the discrepancy, the account is certified. If the manager does not approve the provided activities, documentation, and/or an explanation for the discrepancy, a new task is created, or the previous task is re-activated for the general ledger owner to provide additional activities, documentation, and/or an explanation for the discrepancy. Once additional activities, documentation, and/or an explanation for the discrepancy are provided, a new task is created for the manager to review the new activities, documentation, and/or an explanation for the discrepancy. This loop repeats until the manager approves and the account is certified. If the account is auto-certifiable and the unknown balance is below the threshold amount, the account is auto-certified.

In this manner, a reviewer will be able to perform variance/flux analysis while reviewing account reconciliation. While doing reconciliation, accountants already know what happened in the current month within the given account, which facilitates addressing unidentified balances. In addition, integration with a Journal Entry Suite enables accountants to have visibility as to whether there are any ongoing manual adjustments for the account and, knowing this, accountants can delay reconciliation activity. Without the integration, the accountant may have to redo the reconciliation. In this manner, a reviewer will not only be able to review current account balances and reconciliation entries, but also compare the current time period with prior periods, so as to spot spikes, dips, trends, or other variance in the account balance or activity over time, resulting in a more streamlines and efficient financial close.

The specific embodiments described above have been shown by way of example, and it should be understood that these embodiments may be susceptible to various modifications and alternative forms. It should be further understood that the claims are not intended to be limited to the particular forms disclosed, but rather to cover all modifications, equivalents, and alternatives falling within the spirit and scope of this disclosure.

The techniques presented and claimed herein are referenced and applied to material objects and concrete examples of a practical nature that demonstrably improve the present technical field and, as such, are not abstract, intangible or purely theoretical. Further, if any claims appended to the end of this specification contain one or more elements designated as "means for [perform]ing [a function] . . . " or "step for [perform]ing [a function] . . . ", it is intended that such elements are to be interpreted under 35 U.S.C. 112(f). However, for any claims containing elements designated in any other manner, it is intended that such elements are not to be interpreted under 35 U.S.C. 112(f).

The invention claimed is:

1. A system, comprising:
a processor; and
a memory storing instructions that, when executed by the processor, cause the processor to:
   receive accounting data for an account to be certified and one or more respective customizable threshold values associated with the account;
   determine that a balance sheet for the account is not auto-certifiable based on an unknown balance of the account being above a threshold value of the one or more respective customizable threshold values;
   cause a computing device associated with a general ledger owner of the account to display, via a graphical user interface (GUI), a first task for the general ledger owner of the account based on the unknown balance of the account being above the threshold value, wherein the first task comprises providing an input indicative of a reason for the unknown balance being above the threshold value;
   receive, via the GUI, the input;
   generate a second task for a manager based on the input, wherein the second task comprises providing an approval or a rejection of the reason for the unknown balance being above the threshold value;
   receive, from the manager, the approval; and
   mark the account as certified based on the approval.

2. The system of claim 1, wherein the accounting data comprises one or more journals, one or more balance sheets, or a combination thereof.

3. The system of claim 2, wherein the accounting data is received from one or more enterprise resource planning products (ERPs).

4. The system of claim 1, wherein the instructions cause the processor to determine that the balance sheet for the account is auto-certifiable based on the balance sheet meeting a specified set of criteria for auto-certification.

5. The system of claim 1, wherein the input accounting for the unknown balance comprises one or more pieces of documentation, one or more explanations, one or more activities, or a combination thereof.

6. The system of claim 1, wherein the instructions cause the processor to:
   receive an indication from the manager that the input accounting for the unknown balance is not approved; and
   generate a third task to provide a supplemental input accounting for the unknown balance.

7. A method, comprising:
receiving, from one or more enterprise resource planning products (ERPs), accounting data for an account to be certified and one or more respective customizable threshold values associated with the account;
determining, via a processor, that a balance sheet for the account is not auto-certifiable based on an unknown balance of the account being above a threshold value of the one or more respective customizable threshold values;
causing, via the processor, a computing device associated with a general ledger owner of the account to display, via a graphical user interface (GUI), a first task for the general ledger owner of the account based on the unknown balance of the account being above the threshold value, wherein the first task comprises providing an input indicative of a reason for the unknown balance being above the threshold value;
receiving, via the GUI, the input;
generating, via the processor, a second task for a manager based on the input, wherein the second task comprises providing an approval or a rejection of the reason for the unknown balance being above the threshold value;
receiving, from the manager, the approval; and
marking the account as certified based on the approval.

8. The method of claim 7, wherein the input comprises one or more pieces of documentation, one or more explanations, one or more activities, or a combination thereof.

9. The method of claim 7, comprising:
receiving an indication from the manager that the input accounting for the unknown balance is not approved; and
generating, via the processor, a third task to provide a supplemental input accounting for the unknown balance.

10. The method of claim 7, comprising determining that the balance sheet for the account is auto-certifiable based on a total account balance being within the one or more respective customizable threshold values, a general ledger balance being within the one or more respective customizable threshold values, a total amount of account activity being within the one or more respective customizable threshold values, or any combination thereof.

11. The method of claim 7, wherein the one or more ERPs are associated with operations comprising procurement, production, distribution, accounting, human resources, customer service, sales, or any combination thereof.

12. The method of claim 7, wherein marking the account as certified comprises updating, via the processor, the GUI to display that the account is certified.

13. The method of claim 12, comprising updating the one or more ERPs, via the processor, based on marking the account as certified.

14. A non-transitory computer readable medium storing instructions that, when executed by a processor, causes the processor to perform operations comprising:
receiving accounting data for an account to be certified and one or more customizable threshold values;
determining that a balance sheet for the account is not auto-certifiable based on an unknown balance of the account being above a threshold value of the one or more customizable threshold values;

causing a first computing device associated with a general ledger owner of the account to display, via a first graphical user interface (GUI), a first task for the general ledger owner of the account based on the unknown balance of the account being above the threshold value, wherein the first task comprises providing an input indicative of a reason for the unknown balance being above the threshold value;

receiving, via the first GUI, the input;

causing a second computing device associated with a manager to display, via a second GUI of the second computing device, a second task for the manager based on the input, wherein the second task comprises providing an approval or a rejection of the reason for the unknown balance being above the threshold value;

receiving, from the manager, the approval; and marking the account as certified based on the approval.

15. The non-transitory computer readable medium of claim 14, wherein the input accounting for the unknown balance comprises one or more pieces of documentation, one or more explanations, one or more activities, or a combination thereof.

16. The non-transitory computer readable medium of claim 14, wherein the first GUI corresponds to a dashboard of a financial close automation (FCA) system.

17. The non-transitory computer readable medium of claim 14, wherein the instructions cause the processor to:
receive, via the second GUI, an indication from the manager that the input accounting for the unknown balance is not approved; and
cause the second computing device associated with the manager to display, via the second GUI, a third task for the manager based on the indication, wherein the third task comprises requesting a supplemental input from the general ledger owner accounting for the unknown balance.

18. The non-transitory computer readable medium of claim 14, wherein one or more enterprise resource planning products (ERPs) associated with the balance sheet are updated based on marking the account as certified.

19. The system of claim 1, wherein the computing device is a first computing device, the GUI is a first GUI, and wherein the instructions cause the processor to cause a second computing device associated with the manager to display, via a second GUI, the second task based on receiving the input.

20. The method of claim 7, wherein the computing device is a first computing device, the GUI is a first GUI, and wherein the method comprises causing, via the processor, a second computing device associated with the manager to display, via a second GUI, the second task based on receiving the input.

* * * * *